Figure 1:
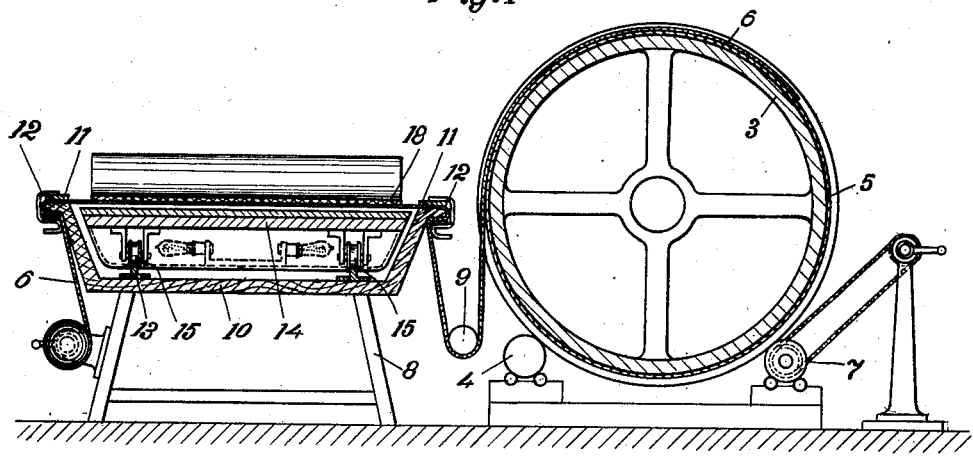

June 10, 1930.                    H. STROBL                     1,763,109
                 METHOD OF MANUFACTURING BALLOON MATERIAL
                            Filed May 22, 1926

Inventor:
Hans Strobl
by Cure+hmann
Attorneys.

Patented June 10, 1930

1,763,109

UNITED STATES PATENT OFFICE

HANS STROBL, OF BERLIN-TEMPELHOF, GERMANY, ASSIGNOR, BY MESNE ASSIGNMENTS, TO LUFTSCHIFFBAU ZEPPELIN G. M. B. H., OF FRIEDRICHSHAFEN, BODENSEE, GERMANY

METHOD OF MANUFACTURING BALLOON MATERIAL

Application filed May 22, 1926, Serial No. 110,963, and in Germany June 13, 1925.

My invention relates to a method of manufacturing balloon material, especially the type of material composed of skins glued together so as to render the material gastight, which may or may not be connected with a layer of fabric.

It is my aim to provide for a continuous working process. This I attain in the following way:

First the skins, which for example may be of animal provenience, such as gold-beaters' skins, are glued together. Formerly this process of gluing together gold beaters' skins which have small dimensions only was performed on horizontal or inclined tables. Thereafter the combined skin sheet was removed from the table and it was held against the window by means of sticks and the like for the purpose of inspecting it against imperfect spots which then were mended in some way or other. There was no reliability with regard to the quality of the ready material.

My new method changes these conditions considerably and warrants a perfect quality of the material. By making use of the method according to my invention it will be possible to make savings in the number of skins necessary for the impermeability against gas so that the material manufactured in accordance therewith will be lighter than the material made after the usual way; and saving in weight is of great importance with balloons and airships.

According to my invention a large drum or the like is used as support on which the skins are glued together. This revolvable drum is lined on the outside with a layer of fabric and on this layer the skin gluing process is performed. A dark color of the lining, for example black, will improve the working conditions because it will be easier to discover unevenness in the skin sheet when it rests on a dark backing.

After the skins are glued together the continuously formed skin sheet advances to a frame. Here it is stretched so as to allow for a close inspection. The width of the material may be such as to suit any requirement. The stretching on the frame is performed by tension in one direction only which may be longitudinal or transverse. I prefer the longitudinal direction for a reason explained later. For the purpose of the desired close inspection of the skin sheet for imperfections it is advisable to have a light shining on the skin or even better, shining from underneath through the skin which is more or less transparent. In this way it will be possible to find all imperfect spots and to mend them before further handling of the material. If thought necessary a special roller may be provided between the device on which the skins are glued together and the frame for inspection, which roller may be so arranged as to always keep the skin sheet under tension.

From the frame the sheet is transported to a table on which it may be varnished or otherwise impregnated, or a layer of fabric may be applied to it. I prefer to eliminate the necessity of further handling of the delicate skin sheet and so I provide a table in combination with the stretching frame. This may be a fixed table over the edges of which the skin sheet is stretched, but it is far better to have a movable table top which may slide underneath the stretched sheet. This is why I prefer the longitudinal direction for stretching the skin sheet which allows for the crosswise arrangement of the sliding table top. If the table is fixed the skin must be illuminated from above or a transparent table top may be provided. With a sliding table top the light may be arranged so as to move underneath and across the sheet together with the table top, for which purpose a special light trough may be arranged at one end of the table top.

After the close inspection of the skin sheet while stretched on the frame it is varnished or the fabric layer is applied to it. I prefer to do this while the sheet is still stretched, the movable table top serving as support for this work. This way of proceeding has the advantage of allowing also of a very good drying of the combined material. Thereafter varnish or other impregnating matter may be applied to the material, all this in accordance with the use for which the material is intended to serve.

Having given a general description of my method of manufacture I now want to point it out more in detail referring to the drawings which represent examples of the devices used in my method and show their position in relation to each other.

Figure 2:
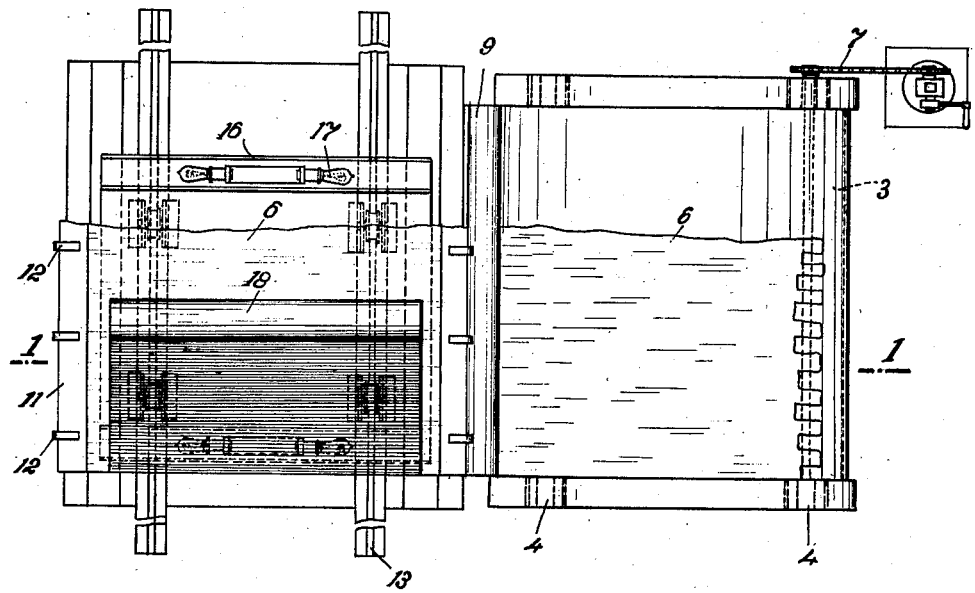

Fig. 1 is a cross sectional view of a device adapted for use with my method taken on line 1—1 of Fig. 2, and Fig. 2 shows a plan view of the same.

A drum 3 supported on rollers 4 is lined on its circumference with a fabric 5 on which the skins of the skin sheet 6 are glued together. A driving means 7 serves for turning drum 3 thereby feeding the manufactured skin sheet 6 to the stretching device 8. For the purpose of having a constant tension in sheet 6, roller 9 is provided which by its weight causes the desired tension.

The stretching device 8 comprises a trough-like frame 10 over which sheet 6 is stretched and held by strips 11 and clamps 12. A table top 14 supported on rollers 15 is arranged so as to slide on rails 13 underneath stretched sheet 6. Table top 14 at both of its ends has light troughs 16 in which electric bulbs 17 serve for illuminating sheet 6 from below for inspection from above.

If so desired the inspected sheet 6 while being stretched may be combined with fabric 18 and table top 14 serving as support for this operation.

I do not want to limit myself to the exact details as described as many variations will occur to those skilled in the art.

What I claim is:

1. A method of manufacturing balloon material which consists in gluing together skins of animal provenience such as gold beaters' skins and the like thereby forming a skin sheet, in stretching said sheet and inspecting it against imperfections in stretched condition by means of translucent light, in mending the imperfect spots, and in thereafter handling the material in any further desired way.

2. A method of manufacturing balloon material which consists in gluing together skins of animal provenience such as gold beaters' skins and the like thereby forming a skin sheet, in stretching said sheet and inspecting it against imperfections in stretched condition by means of translucent light, in mending the imperfect spots, in applying a fabric layer to said stretched skin sheet, and in thereafter handling the material in any further desired way.

3. A device for manufacturing balloon material comprising a revolvable drum-like support, a stretching frame next to it, and illuminating means underneath said frame, said illuminating means being adapted to be moved along said frame in the longitudinal axis of said drum-like support.

4. A device for the manufacture of balloon material comprising a revolvable drum-like support, a stretching frame next to it, and illuminating means underneath said frame, said illuminating means being adapted to be moved along said frame and comprising also a transparent table top adapted to serve as support for any material stretched on said frame.

HANS STROBL.